United States Patent
Tokui

(10) Patent No.: US 12,367,025 B2
(45) Date of Patent: Jul. 22, 2025

(54) COMPILER, GENERATION METHOD, CHIP, AND EXECUTION METHOD

(71) Applicant: Preferred Networks, Inc., Tokyo (JP)

(72) Inventor: Seiya Tokui, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 207 days.

(21) Appl. No.: 18/048,934

(22) Filed: Oct. 24, 2022

(65) Prior Publication Data

US 2023/0129676 A1 Apr. 27, 2023

(30) Foreign Application Priority Data

Oct. 26, 2021 (JP) .................................. 2021-174381

(51) Int. Cl.
*G06F 8/51* (2018.01)

(52) U.S. Cl.
CPC ..................................... *G06F 8/51* (2013.01)

(58) Field of Classification Search
CPC ........................................................ G06F 8/51
USPC .................................................. 717/151–157
See application file for complete search history.

(56) References Cited

U.S. PATENT DOCUMENTS 5,751,987 A 5/1998 Mahant-Shetti et al.
9,779,786 B1* 10/2017 Wu .......................... G11C 7/10
11,687,341 B2* 6/2023 Garegrat ............... G06F 9/3001
    712/222
2007/0208760 A1 9/2007 Reuter et al.
2019/0391811 A1* 12/2019 Garegrat ............. G06F 9/30036

FOREIGN PATENT DOCUMENTS

| JP | H06-208501 | 7/1994 |
| JP | 2007-242017 | 9/2007 |
| JP | 2020-517006 | 6/2020 |
| WO | 2018/185765 | 10/2018 |

OTHER PUBLICATIONS

Venkat et al., "Loop and Data Transformations for Sparse Matrix Code", 2015, ACM, pp. 521-532. (Year: 2015).*
Kjolstad et al., "The Tensor Algebra Compiler", 2017, ACM, 29 pages. (Year: 2017).*
Senanayake et al., "A Sparse Iteration Space Transformation Framework for Sparse Tensor Algebra", 2020, ACM, 30 pages. (Year: 2020).*
The NumPy community, "NumPy internals", Aug. 10, 2021 version, <URL:https://numpy.org/doc/stable/reference/internals.html>.
Anaconda, Inc. and Contributors, "Array-Dask documentation", Aug. 13, 2021 version,<URL:https://docs.dask.org/en/latest/array.html>.

(Continued)

*Primary Examiner* — Ted T. Vo
(74) *Attorney, Agent, or Firm* — IPUSA, PLLC

(57) ABSTRACT

A compiler, for generating machine code to be executed in a chip including a plurality of distributed memories connected by a tree structure topology, includes at least one memory and at least one processor. The at least one processor is configured to associate each element of a tensor to be processed with an address in the plurality of memories included in the chip, based on a stride and a number of divisions in a predetermined hierarchy of the tree structure with respect to the tensor to be processed.

20 Claims, 15 Drawing Sheets

(56) References Cited

OTHER PUBLICATIONS

Hiroya Kaneko, "Accelerating Deep Learning Workloads with the MN-Core Compiler", Preferred Networks Research & Development, Aug. 16, 2021 Version, published on Jun. 11, 2021,<URL:https://tech.preferred.jp/en/blog/mncore-compiler-1/>.

Preferred Networks, "MN-Core Accelerator for Deep Learning", Aug. 16, 2021 version,<URL:https://projects.preferred_jp/mn-core/en/>.

Preferred Networks, "MN-Core Custom deep learning processor"Aug. 16, 2021 version,<URL:https://www.preferred.jp/en/projects/mn-core/>.

TensorFlow, "Tiled layout", Sep. 24, 2021 version, <URL:https://www.tensorflow.org/xla/tiled_layout?hl=en>.

* cited by examiner

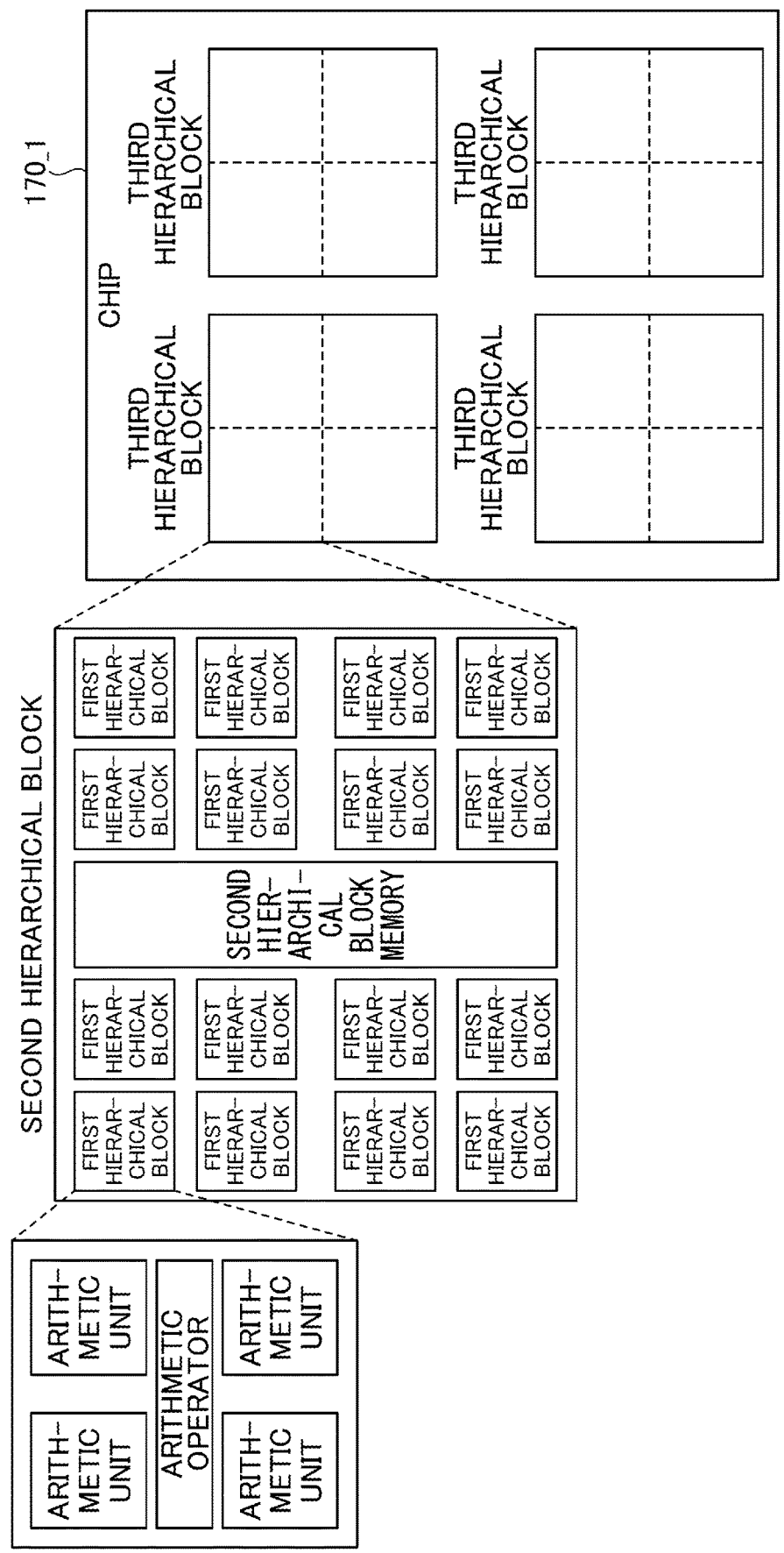

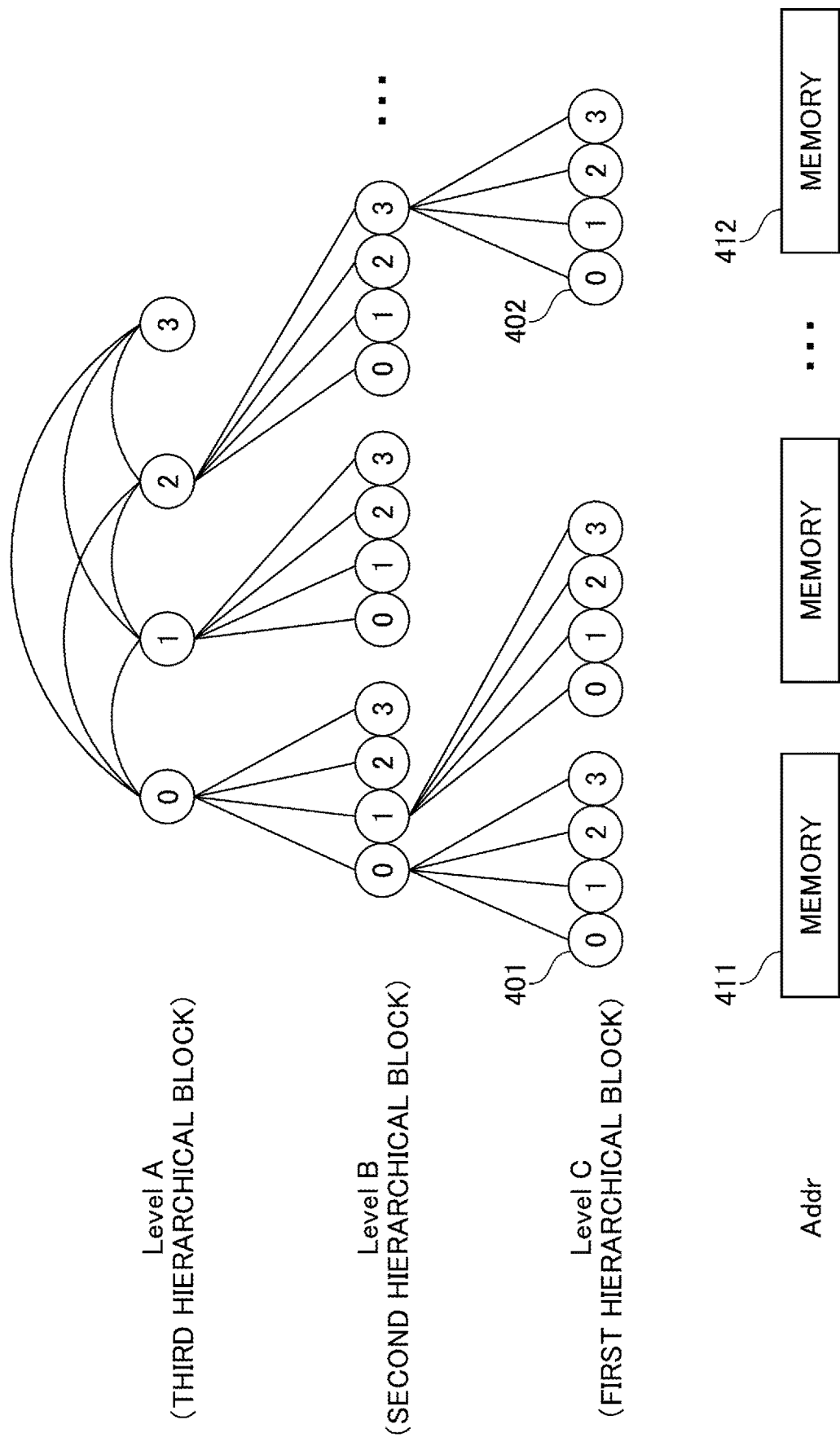

FIG.5

\<LAYOUT DESCRIPTION\>

((DESCRIPTION REGARDING VERTICAL ARRANGEMENT), ..., (DESCRIPTION REGARDING HORIZONTAL ARRANGEMENT))

(DESCRIPTION REGARDING FIRST LEVEL, ..., DESCRIPTION REGARDING MEMORY OF LOWEST LEVEL)

DESCRIPTION REGARDING FIRST LEVEL: NUMBER OF DIVISIONS_LEVEL NAME: STRIDE

DESCRIPTION REGARDING MEMORY OF LOWEST LEVEL: NUMBER OF DIVISIONS_ADDRESS OF MEMORY: STRIDE (DESCRIPTION REGARDING FIRST LEVEL, ..., DESCRIPTION REGARDING MEMORY OF LOWEST LEVEL)

DESCRIPTION REGARDING FIRST LEVEL: NUMBER OF DIVISIONS_LEVEL NAME: STRIDE

DESCRIPTION REGARDING MEMORY OF LOWEST LEVEL: NUMBER OF DIVISIONS_ADDRESS OF MEMORY: STRIDE

```
//TENSOR DESCRIPTION

TENSOR X (100 × 100 MATRIX)

//LAYOUT DESCRIPTION ((2_A: 2, 2_B: 2, 25_Addr: 25), (2_A: 1, 2_B: 1, 25_Addr: 1))
```

```
//TENSOR DESCRIPTION

TENSOR X (100 × 100 MATRIX)

//LAYOUT DESCRIPTION ((4_A: 1, 25_Addr: 25), (4_B: 1, 25_Addr: 1))
```

FIG.10
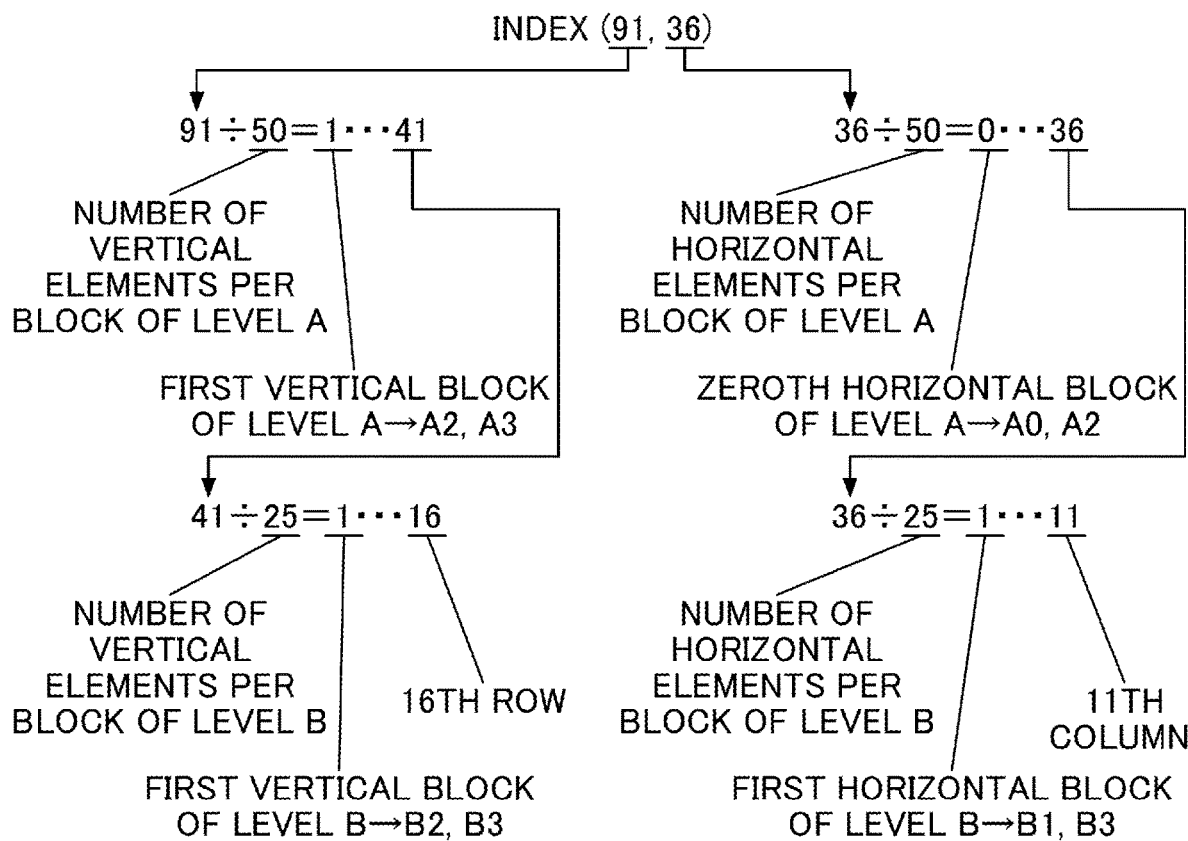
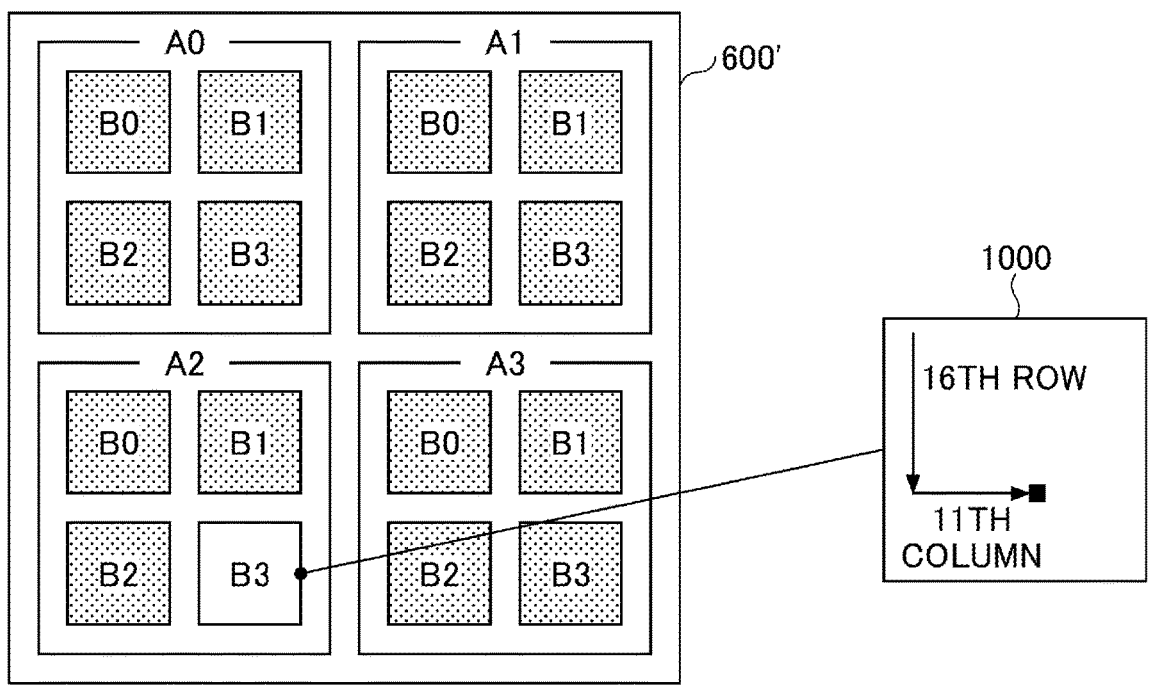

FIG.11
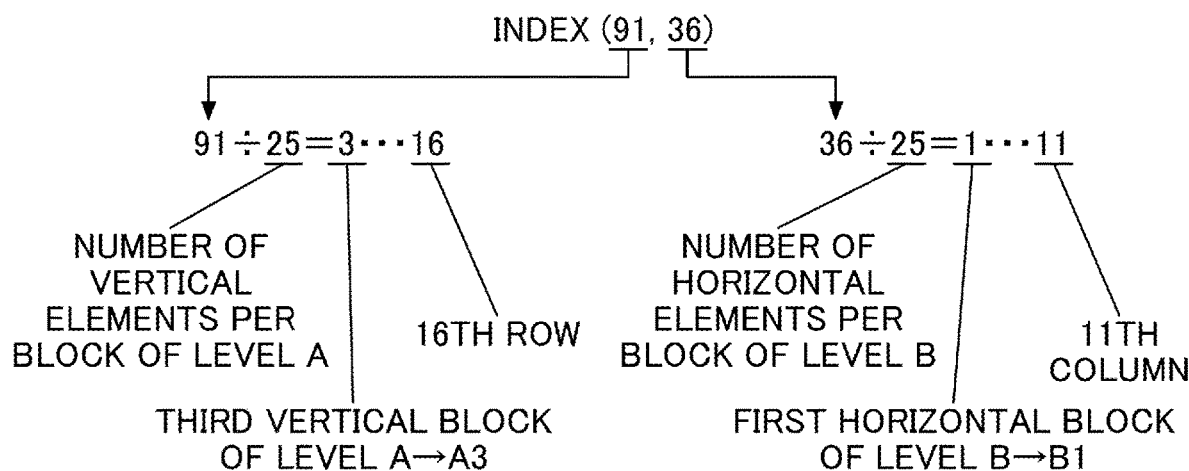
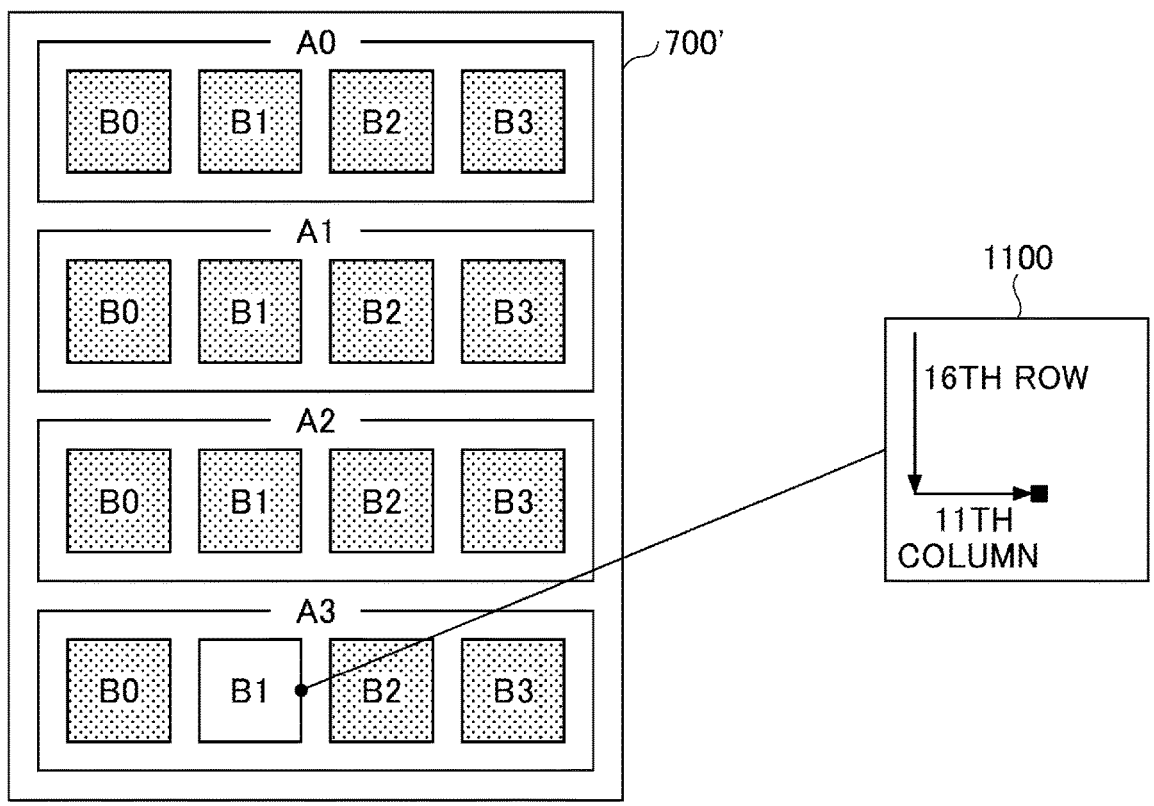

COMPILER, GENERATION METHOD, CHIP, AND EXECUTION METHOD

CROSS-REFERENCE TO RELATED APPLICATIONS

This application is based upon and claims priority to Japanese Patent Application No. 2021-174381 filed on Oct. 26, 2021, the entire contents of which are incorporated herein by reference.

BACKGROUND

1. Technical Field

The present disclosure relates to a compiler, a generation method, a chip, and an execution method.

2. Description of the Related Art

When describing a source code, a user can specify where each element of a tensor is placed in a memory.

On the other hand, an accelerator chip for deep learning, for example, may work with a Single Instruction/Multiple Data (SIMD) architecture in which multiple memories (Static Random Access Memory: SRAM) connected by a tree structure topology are distributed. For this reason, when processing each element of the tensor using the accelerator chip, it is important to determine where each element of the tensor is located in which of the multiple memories.

RELATED-ART DOCUMENTS

Patent Documents

Patent Document 1: Japanese Translation of PCT International Application Publication No. 2020-517006
Patent Document 2: Japanese Unexamined Patent Application Publication No. 2007-242017
Patent Document 3: Japanese Unexamined Patent Application Publication No. 1994-208501

SUMMARY

The present disclosure allows an arrangement of each element of the tensor to be properly represented for multiple memories connected by a tree structure topology.

According to one aspect of the present disclosure, a compiler, for generating a machine code to be executed in a chip including a plurality of distributed memories connected by a tree structure topology, includes at least one memory and at least one processor is provided. The at least one processor is configured to associate each element of a tensor to be processed with an address in the plurality of memories included in the chip, based on a stride and a number of divisions in a predetermined hierarchy of the tree structure with respect to the tensor to be processed.

BRIEF DESCRIPTION OF THE DRAWINGS

FIG. 3 is a diagram illustrating an example of a hardware configuration of an accelerator chip;
FIG. 4 is a diagram illustrating an example of multiple memories connected by a tree structure topology;
FIG. 5 is a diagram illustrating a description method of a layout description;
FIG. 10 is a first diagram illustrating an example of processing by an element value reading unit;
FIG. 11 is a second diagram illustrating an example of processing by the element value reading unit.

DETAILED DESCRIPTION

Hereinafter, each embodiment will be described with reference to the accompanying drawings. In the present specification and drawings, for devices having substantially the same functional configuration, the same functional configuration will be denoted by the same reference signs, and a repetitive description thereof will be omitted.

First Embodiment

<System Configuration of Data Processing System and Hardware Configuration of Each Device>

The overall system configuration of a data processing system having a server device according to a first embodiment and the hardware configuration of each device constituting the data processing system will be described first.

Figure 1:
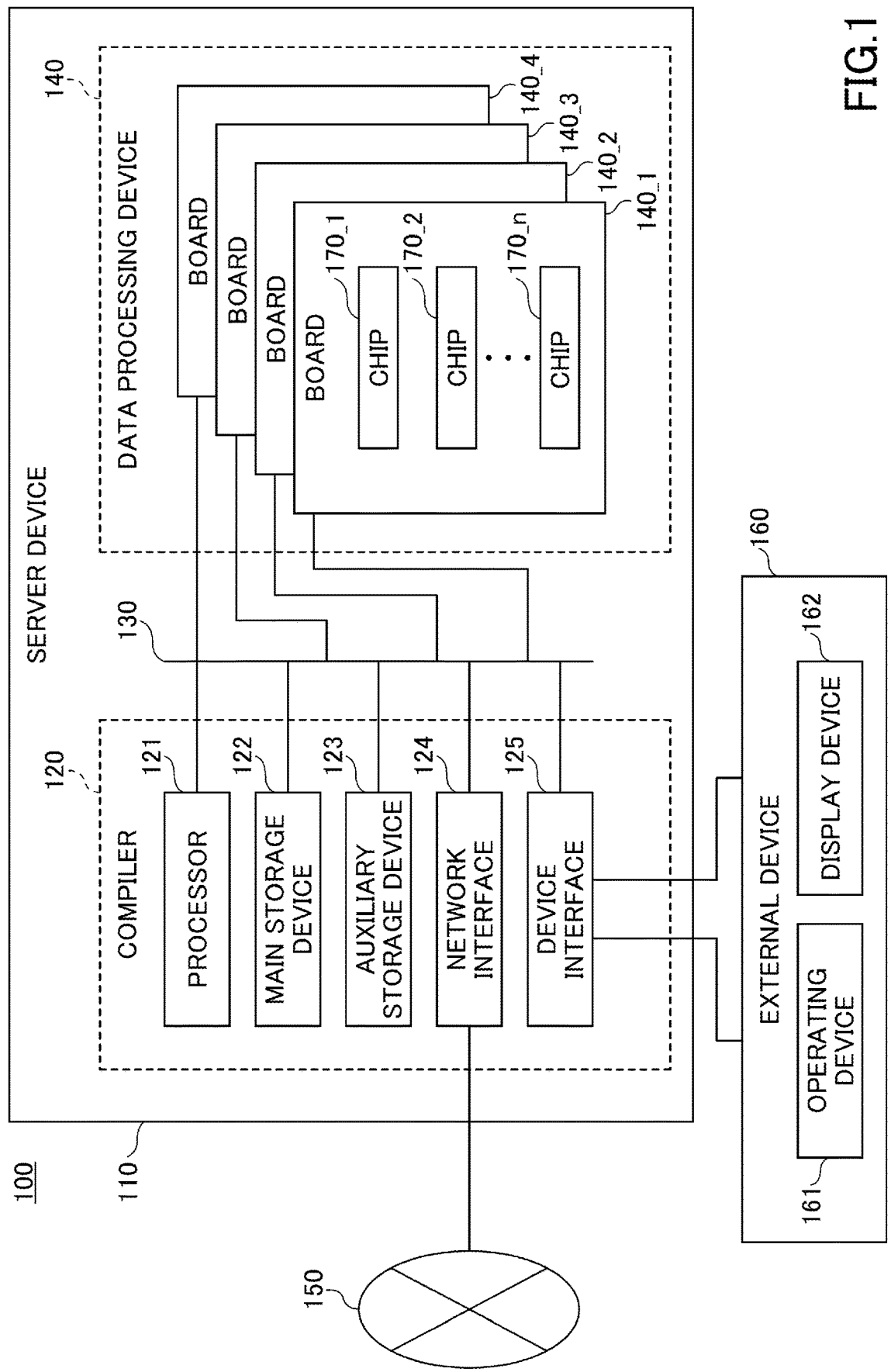
FIG. 1 is a diagram illustrating an example of a system configuration of a data processing system and a hardware configuration of each device.

As illustrated in FIG. 1, a data processing system 100 includes a server device 110 and an external device 160. Further, as illustrated in FIG. 1, the server device 110 includes a compiler 120 and a data processing device 140.

The compiler 120 includes, as an example, a processor 121, a main storage device (memory) 122, an auxiliary storage device (memory) 123, a network interface 124, and a device interface 125. The compiler 120 may be implemented as a computer in which these components are connected to each other via a bus 130.

The processor 121 may be an electronic circuit (such as a processing circuit, a processing circuitry, a CPU, a GPU, an FPGA, or an ASIC). The processor 121 may also be a semiconductor device or the like that includes a dedicated processing circuit. The processor 121 is not limited to an electronic circuit that uses an electronic logic element, but may be implemented by an optical circuit that uses an optical logic element. The processor 121 may have a computing function based on quantum computing.

The processor 121 may perform various operations based on various data and instructions that are input from devices provided internally as components in the compiler 120, and may output operation results and control signals to the devices. The processor 121 may control the devices provided by the compiler 120 by executing an operating system (OS), an application, or the like.

The processor 121 may also refer to one or more electronic circuits provided on one chip, or may refer to one or more electronic circuits disposed on two or more chips or two or more devices. When multiple electronic circuits are used, each electronic circuit may communicate by performing wired communication or wireless communication.

The main storage device 122 may be a storage device that stores instructions and various data executed by the processor 121, and the various data stored in the main storage device 122 may be read by the processor 121. The auxiliary storage device 123 may be a storage device other than main storage device 122. Each of these storage devices may be any electronic component that can store various kinds of data, and may be a semiconductor memory. The semiconductor memory may be either a volatile memory or a non-volatile memory. The storage device that stores various data in the compiler 120 may be implemented by the main storage device 122 or the auxiliary storage device 123, or may be implemented by an internal memory incorporated in the processor 121.

The network interface 124 may be an interface that connects to the communication network 150 by wireless or wired communication. An appropriate interface, such as an interface that conforms to an existing communication standard, may be used for the network interface 124. The communication network 150 may be any one or a combination of a wide area network (WAN), a local area network (LAN), a personal area network (PAN), or the like. An example of the WAN may be the Internet, an example of the LAN may be IEEE 802.11 or Ethernet, and an example of the PAN may be Bluetooth® or near field communication (NFC).

The device interface 125 may be an interface, such as a USB that directly connects to the external device 160.

The external device 160 may be a device connected to a computer. The external device 160 may be, for example, an input device. The input device may be, for example, an operating device 161 such as a keyboard, a mouse, or a touch panel that provides the acquired information to the computer.

The external device 160 may be, for example, an output device. The output device may be, for example, a loudspeaker that outputs sound or a display device such as a liquid crystal display (LCD), a cathode ray tube (CRT), a plasma display panel (PDP), or an organic electroluminescent (EL) panel.

The data processing device 140 includes multiple boards (boards 140_1 to 140_4) for each device. The boards 140_1 to 140_4 carry multiple accelerator chips (for example, chips 170_1 to 170_n).

As illustrated in FIG. 1, each device of the compiler 120 and each device of the data processing device 140 are connected via the bus 130. In the example of FIG. 1, the case in which the data processing device 140 includes four boards 140_1 to 140_4 is illustrated, but the number of boards of the data processing device 140 may be selected appropriately.

The chips 170_1 to 170_n are, for example, dedicated chips specialized for a learning phase of deep learning. The details of the chips 170_1 to 170_n will be described later.

<Functional Configuration of Each Device of Data Processing System>

Figure 2:
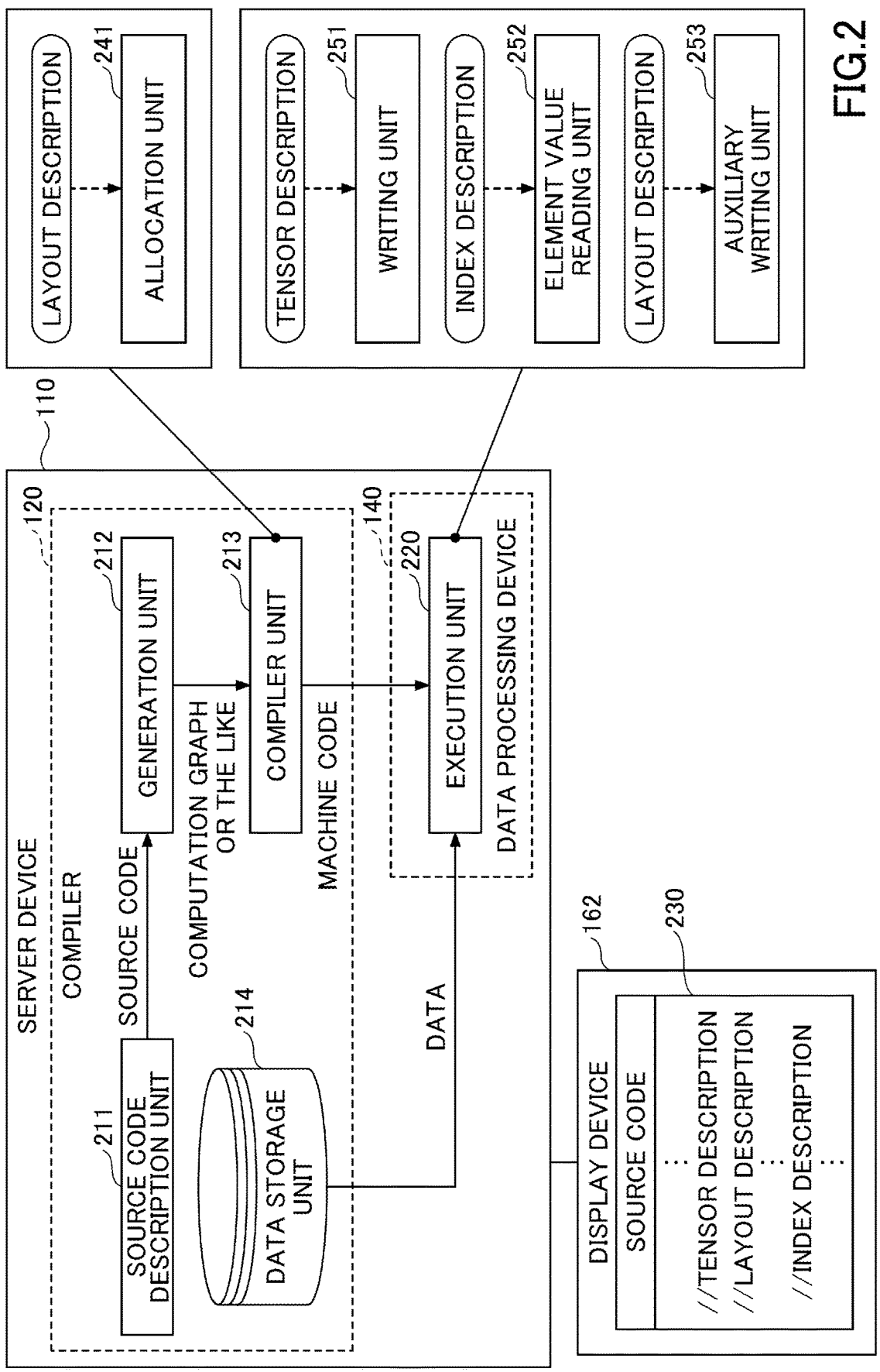
FIG. 2 is a first diagram illustrating an example of a functional configuration of each device of a data processing system.

Next, the functional configuration of each device of the data processing system 100 (here, the server device 110 and the display device 162) will be described. FIG. 2 is a first diagram illustrating an example of a functional configuration of each device of a data processing system.

A generation program for generating a source code and a compiler for generating a machine code is installed in the compiler 120. The compiler 120 functions as a source code description unit 211, a generation unit 212, and a compiler unit 213 by executing the programs.

A user of the compiler 120 starts describing a source code by starting the source code description unit 211. In FIG. 2, a source code 230 is an example of the source code being described that is displayed on the display device 162, and in the present embodiment, the source code 230 includes a tensor description, a layout description, an index description, and the like. The generation unit 212 is notified of the described source code 230.

The generation unit 212 generates a computation graph based on the source code 230. The computation graph is a graphical representation of a flow of calculation from an input tensor to an output tensor, or a graphical representation of a flow of calculation that updates the tensor value. For example, if the source code 230 is described in Python (registered trademark) code, the computation graph is generated by executing the source code 230 and converting the source code 230 into an ONNX format. Note that ONNX is an abbreviation for Open Neural Network Exchange.

Further, the generation unit 212 generates a layout instruction based on the source code 230. The layout instruction is information generated based on the layout description included in the source code 230 to perform a process of allocating an address to each element of the tensor. Here, the "process of allocating an address to each element of the tensor" is an example of a "process of associating each element of the tensor with an address." The "process of associating each element of the tensor with an address" includes at least either the "process of allocating an address to each element of the tensor" or the "process of allocating each element of the tensor to an address."

The compiler unit 213 is notified of the computation graph and the layout instruction (hereinafter, referred to as computation graph, etc.) generated in the generation unit 212.

The compiler unit 213 notified of the computation graph, etc. by the generation unit 212 performs a compiling process by inputting the computation graph, and generates a machine code. At this time, the compiler unit 213 functions as an allocation unit. Specifically, the compiler unit 213, for example, allocates to each element of the tensor an address of any memory (which may be an SRAM as an example) within the chips 170_1 to 170_n under the layout instruction generated based on the layout description.

The generated machine code is input to the data processing device 140 together with the data stored in the data storage unit 214.

The boards 140_1 to 140_4 of the data processing device 140 function as an execution unit 220 which executes the machine code generated by the compiler unit 213 and processes the data stored in the data storage unit 214.

At this time, the execution unit 220 functions as a writing unit 251. The writing unit 251 writes a value of each element of the tensor (the data stored in the data storage unit 214) to the memory address within the chips 170_1 to 170_n allocated by an allocation unit 241, for example, based on the tensor description.

The execution unit 220 functions as an element value reading unit 252. The element value reading unit 252 reads out the value of the specified element of the tensor written into the memory within the chips 170_1 to 170_n, for example, based on the index description.

Further, the execution unit 220 functions as an auxiliary writing unit 253. The auxiliary writing unit 253 complements the value of each element of the tensor based on, for example, the layout description. Specifically, the auxiliary writing unit 253 performs a padding process to complement the insufficient value of the element so as to adjust a size of the tensor according to the memory to be written to. Further, the auxiliary writing unit 253 performs a broadcasting process to adjust a shape when calculating the elements of the tensors that do not match the shape of the array.

<Accelerator Chip Hardware Configuration>

Next, a hardware configuration of the accelerator chip (for example, chips 170_1 to 170_n) mounted on the boards 140_1 to 140_4 will be described. FIG. 3 is a diagram illustrating an example of a hardware configuration of the accelerator chip.

The chip 170_1 (all chips 170_1 to 170_n have the same hardware configuration, and will be described herein for the chip 170_1) operates, for example, by a SIMD architecture. The SIMD is an abbreviation for Single Instruction/Multiple Data, and refers to a method of applying a single instruction to a plurality of data simultaneously and processing them in parallel. However, the chip 170_1 may operate with an architecture other than the SIMD architecture.

As illustrated in FIG. 3, the chip 170_1 includes four third hierarchical blocks. Each third hierarchical block includes four second hierarchical blocks. Each second hierarchical block includes a plurality of first hierarchical blocks and one second hierarchical block memory.

Each first hierarchical block includes one arithmetic operator and four arithmetic units. The four arithmetic units supply data to the arithmetic unit.

As described above, the chip 170_1 includes a plurality of first hierarchical blocks distributed among four second hierarchical blocks and four third hierarchical blocks, which are connected by a tree structure topology. Therefore, the communication cost between the memories included in the plurality of the first hierarchical blocks in the chip 170_1 is not uniform. For example, communication between memories close to each other is low in cost, whereas communication between memories that need to go back through the hierarchy of the tree structure is high in cost.

<Tree Structure Topology>

Next, a specific example of a plurality of memories connected by a tree structure topology will be described. FIG. 4 is a diagram illustrating an example of a plurality of memories connected by the tree structure topology.

As illustrated in the example of FIG. 4, the four third hierarchical blocks belong to a hierarchy Level A of the tree structure and are connected to each other. Further, each of the four second hierarchical blocks included in each third hierarchical block belongs to a hierarchy Level B of the tree structure and is connected to the corresponding third hierarchical block of the hierarchy Level A of the tree structure.

Further, each of the four first hierarchical blocks included in each of the second hierarchical blocks belonging to the hierarchy Level B of the tree structure belongs to a hierarchy Level C of the tree structure, and each is connected to the corresponding second hierarchical block of the hierarchy Level B of the tree structure.

In this regard, for example, a case where "a value written in the memory 411 included in the first hierarchical block of Level C illustrated by the reference numeral 401" is moved to "the memory 412 included in the first hierarchical block of Level C illustrated by the reference numeral 401" is considered.

In this case, the chip 170_1 is required to perform procedures such as "traversing the hierarchy of the tree structure from Level C→Level B→Level A", "straddling different blocks within Level A", and "proceeding through the hierarchy of the tree structure from Level A→Level B→Level C", thereby incurring the communication cost. Meanwhile, in order to reduce the communication cost, it is effective to write a value into a memory in proximity to the memory 412 instead of writing a value into the memory 411.

That is, in the case of the chip 170_1 in which a plurality of memories connected by the tree structure topology are distributed, it is important to appropriately allocate memory addresses to each element of the tensor so that the values of each element of the tensor are written in the memory considering the hierarchy of the tree structure.

In the data processing system 100 of the present embodiment, the source code description unit 211 that performs the "layout description" by using a description method capable of appropriately allocating a memory address to each element of the tensor, the compiler unit 213 that allocates an address to each element of the tensor according to the description method, and the execution unit 220 that writes the value of each element of the tensor (the data stored in the data storage unit 214) to the allocated address are provided.

<Description Method of Layout Description>

Next, a description method of the layout description will be described. FIG. 5 is a diagram illustrating a description method of a layout description.

As illustrated in FIG. 5, the layout description includes, in parentheses, a description regarding a vertical arrangement and a description regarding a horizontal arrangement, both separated by a comma.

As illustrated in FIG. 5, the description regarding the vertical arrangement includes a description regarding the first level, a description regarding the second level, and the like. Further, the description regarding the vertical arrangement includes a description regarding the memory of the lowest level. The description regarding the first level is, for example, a description regarding the Level A of FIG. 4, and the description regarding the second level is, for example, a description regarding the Level B of FIG. 4. Further, the description regarding the memory of the lowest level is, for example, a description regarding the memory included in the first hierarchical block of Level C of FIG. 4.

Further, as illustrated in FIG. 5, the description content of the n-th level (N is an integer greater than or equal to 1) is "Number of divisions_Level name: stride", and the description content of the description regarding the memory of the lowest level is "Number of divisions_Address of memory: stride."

Note that the "Stride" here is information indicating how much the block name (or an address in the case of the lowest hierarchy) are advanced when a block (or an element of a tensor in the case of the lowest hierarchy) is advanced vertically by one in each hierarchy. However, the block name may be an identifier (number, name, etc.) capable of identifying each block.

For example, assume that the block names of the four third hierarchical blocks in the hierarchy Level A are "A0" to "A3." Further, assume that from the left of the first line, the third hierarchical blocks are arranged in the order "A0" and "A1", and from the left of the second line, the third hierarchical blocks are arranged in the order "A2" and "A3". In this case, if the third hierarchical block of block name="A0" is moved forward by one block vertically, the block name moves forward by two blocks ("A0"→"A2", "A1"→"A3"). Thus, in the case of such orientation, the stride is "2."

For example, in the hierarchy Level C, assume that the addresses of the memory 411 allocated to the element of the first line of the tensor are "0" to "24", the addresses of the memory 411 allocated to the element of the second line of the tensor are "25" to "49", and the like. In this case, if the element of the tensor is moved forward by one element vertically, the address moves forward by 25 ("0"→"25"→ . . . ). Thus, in the case of such memory, the stride is "25." Note that the explanation of the above-described stride is an example, and the stride may be in any other form of expression as long as it is information indicating a change in block names in the vertical direction in each hierarchy.

Similarly, as illustrated in FIG. 5, the description regarding the horizontal arrangement includes a description regarding the first level, a description regarding the second level, and the like. Further, the description regarding the horizontal arrangement includes a description regarding the memory of the lowest level.

Further, as illustrated in FIG. 5, the description content of the n-th level (N is an integer greater than or equal to 1) is "Number of divisions_Level name: stride", and the description content of the description regarding the memory of the lowest level is "Number of divisions_Address of memory: stride."

Note that the "Stride" here is information indicating how much the block name (or an address in the case of the lowest hierarchy) are advanced when a block (or an element of a tensor in the case of the lowest hierarchy) is advanced horizontally by one in each hierarchy.

For example, assume that the block names of the four third hierarchical blocks in the hierarchy Level A are "A0" to "A3." Further, assume that from the left of the first line, the third hierarchical blocks are arranged in the order "A0" and "A1", and from the left of the second line, the third hierarchical blocks are arranged in the order "A2" and "A3". In this case, if the third hierarchical block of block name="A0" is moved forward by one block horizontally, the block name moves forward by one block ("A0"→"A1", "A2"→"A3"). Thus, in the case of such orientation, the stride is "1."

For example, in the hierarchy Level C, assume that the addresses of the memory 411 allocated to the element of the first line of the tensor are "0" to "24", the addresses of the memory 411 allocated to the element of the second line of the tensor are "25" to "49", and the like. In this case, if the element of the tensor is moved forward by one element vertically, the address moves forward by one ("0"→"1"→ . . . ). Thus, in the case of such memory, the stride is "1." Note that the explanation of the above-described stride is an example, and the stride may be in any other form of expression as long as it is information indicating a change in block names in the horizontal direction in each hierarchy.

In this way, by dividing the descriptions into descriptions of vertical arrangement and descriptions of horizontal arrangement, and by specifying the number of divisions and stride for each hierarchy, the following advantages are obtained. A highly expressive description method can be implemented, and even when multiple memories are connected by a complex tree structure topology, the arrangement of each element of the tensor with respect to the multiple memories can be properly represented. This enables appropriate addresses to be allocated to each element of the tensor, and the chip 170_1 can reduce the communication cost between memories. A highly expressive description method can be implemented, and the limitations imposed on each operation can be handled. Since the user can intuitively understand the arrangement of each element of the tensor in multiple memories, the user can optimize the operation considering the arrangement of each element of the tensor and arrange each element of the tensor considering the characteristics of the SIMD. Because the arrangement of each element can be aligned between tensors, it is advantageous in operation by the SIMD architecture.

Example of Layout Description and Processing by Allocation Unit (1) Example 1

Figures 6A, 6B:
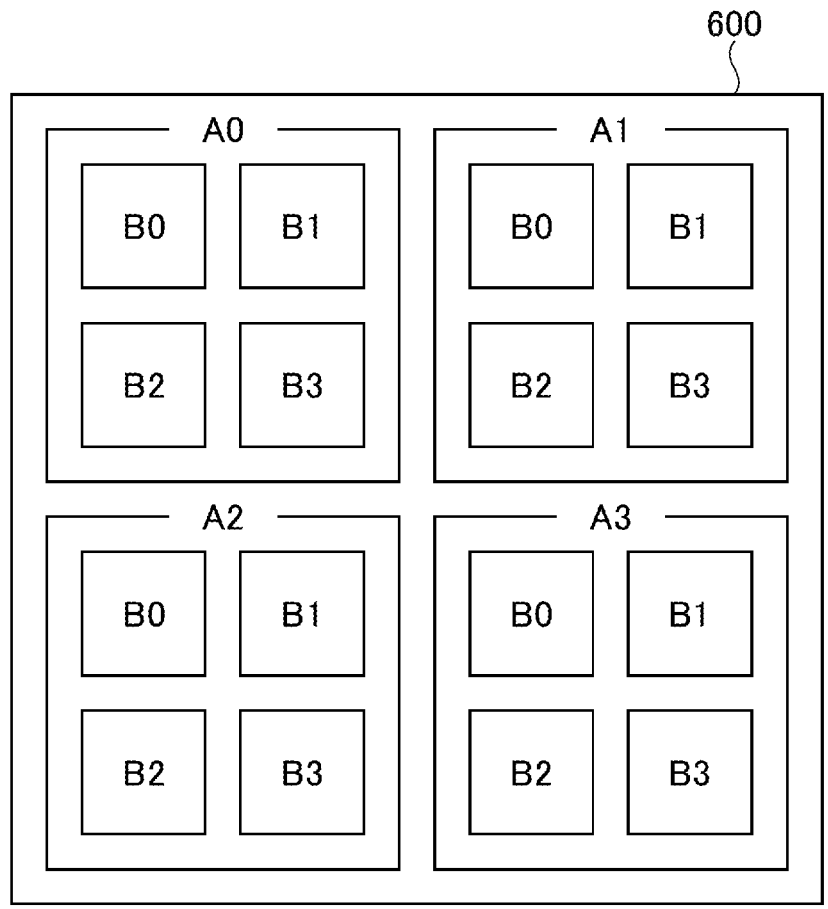
FIG. 6A is a first diagram illustrating an example of a layout description and processing by an allocation unit.
FIG. 6B is a first diagram illustrating an example of the layout description and processing by the allocation unit.

Next, a specific example of the layout description will be described. FIG. 6A and FIG. 6B are diagrams illustrating an example of the layout description. In the example illustrated in FIG. 6A and FIG. 6B, the number of hierarchies is set to "2" (first hierarchy=Level A, second hierarchy=lowest hierarchy=Level B) for simplification of explanation.

As illustrated in FIG. 6B, when each element of a tensor X of 100 rows by 100 columns is allocated to the memory contained in the block of Level B in the lowest hierarchy of a chip 600 of FIG. 6A, the layout description is, for example, ((2_A:2,2_B:2,25_Addr:25), (2_A:1,2_B:1,25_Addr:1)).

In this case, in the description regarding the vertical arrangement, 2_A:2 represents "in Level A, 100 vertical elements are divided into two parts to form clusters of 50 elements" and "in Level A, advancing one block in the vertical direction advances the block name by two ("A0"→"A2" or "A1"→"A3")."

Further, in the description regarding the vertical arrangement, 2_B:2 represents "in Level B, 50 vertical elements are divided into two parts to form clusters of 25 elements" and "in Level B, advancing one block in the vertical direction advances the block name by two ("B0"→"B2" or "B1"→"B3")."

Further, in the description regarding the vertical arrangement, 25_Addr:25 represents "25 elements in the vertical direction are divided into 25 elements in the memory included in the block of Level B" and "in the memory included in the block of Level B, advancing one element of the tensor in the vertical direction advances the addresses by 25 (for example, "0"→"25", "1"→"26", and the like)."

Meanwhile, in the description regarding the horizontal arrangement, 2_A:1 represents "in Level A, 100 horizontal elements are divided into two parts to form clusters of 50 elements" and "in Level A, advancing one block in the horizontal direction advances the block name by one ("A0"→"A1" or "A2"→"A3")."

Further, in the description regarding the horizontal arrangement, 2_B:1 represents "in Level B, 50 horizontal elements are divided into two parts to form clusters of 25 elements" and "in Level B, advancing one block in the horizontal direction advances the block name by one ("B0"→"B1" or "B2"→"B3")."

Further, in the description regarding the horizontal arrangement, 25_Addr:1 represents "25 elements in the horizontal direction are divided into 25 elements in the memory included in the block of Level B" and "in the memory included in the block of Level B, advancing one element of the tensor in the horizontal direction advances the addresses by one (for example, "0"→"1", "1"→"2", and the like)."

As described above, according to the layout description, the allocation unit 241 can allocate the memory address included in the block of Level B of the chip 600 to each element of 100 rows by 100 columns.

(2) Example 2

Figures 7A, 7B:
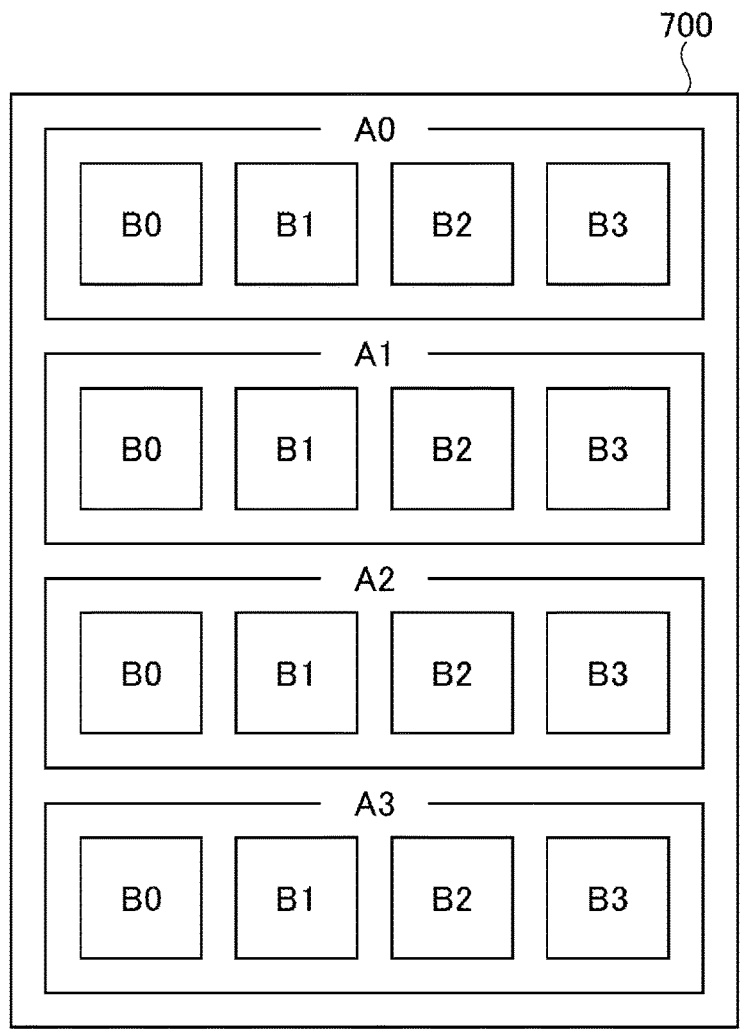
FIG. 7A is a second diagram illustrating an example of a layout description and processing by the allocation unit.
FIG. 7B is a second diagram illustrating an example of the layout description and processing by the allocation unit.

Next, another example of the layout description will be described. FIG. 7A and FIG. 7B are diagrams illustrating an example of the layout description. In the example illustrated in FIG. 7A and FIG. 7B, the number of hierarchies is set to "2" (first hierarchy=Level A, second hierarchy=lowest hierarchy=Level B) for simplification of explanation. However, in the example of FIG. 7A, the block separation method differs from the example of FIG. 6A (refer to FIG. 7A).

As illustrated in FIG. 7B, when each element of a tensor X of 100 rows by 100 columns is allocated to the memory contained in the block of Level B in the lowest hierarchy of a chip 700 of FIG. 7A, the layout description is, for example, ((4_A:1,25_Addr:25), (4 B:1,25 Addr:1)).

In this case, in the description regarding the vertical arrangement, 4_A:1 represents "in Level A, 100 vertical elements are divided into four parts to form clusters of 25 elements" and "in Level A, advancing one block in the vertical direction advances the block name by one ("A0"→"A1", "A1"→"A2", and "A2"→"A3")."

Further, in the description regarding the vertical arrangement, 25_Addr:25 represents "25 elements in the vertical direction are divided into 25 elements in the memory included in the block of Level B" and "in the memory included in the block of Level B, advancing one element of the tensor in the vertical direction advances the addresses by 25 (for example, "0"→"25", "1"→"26", and the like)."

Meanwhile, in the description regarding the horizontal arrangement, 4_B:1 represents "in Level B, 100 horizontal elements are divided into four parts to form clusters of 25 elements" and "in Level B, advancing one block in the horizontal direction advances the block name by one ("B0"→"B1", "B1"→"B2", and "B2"→"B3")."

Further, in the description regarding the horizontal arrangement, 25_Addr:1 represents "25 elements in the horizontal direction are divided into 25 elements in the memory included in the block of Level B" and "in the memory included in the block of Level B, advancing one element of the tensor in the horizontal direction advances the addresses by one (for example, "0"→"1", "1"→"2", and the like)."

As described above, according to the layout description, the allocation unit 241 can allocate the memory address included in the block of Level B of the chip 700 to each element of 100 rows by 100 columns.

Example of Processing by Writing Unit (1) Example 1

Figure 8:
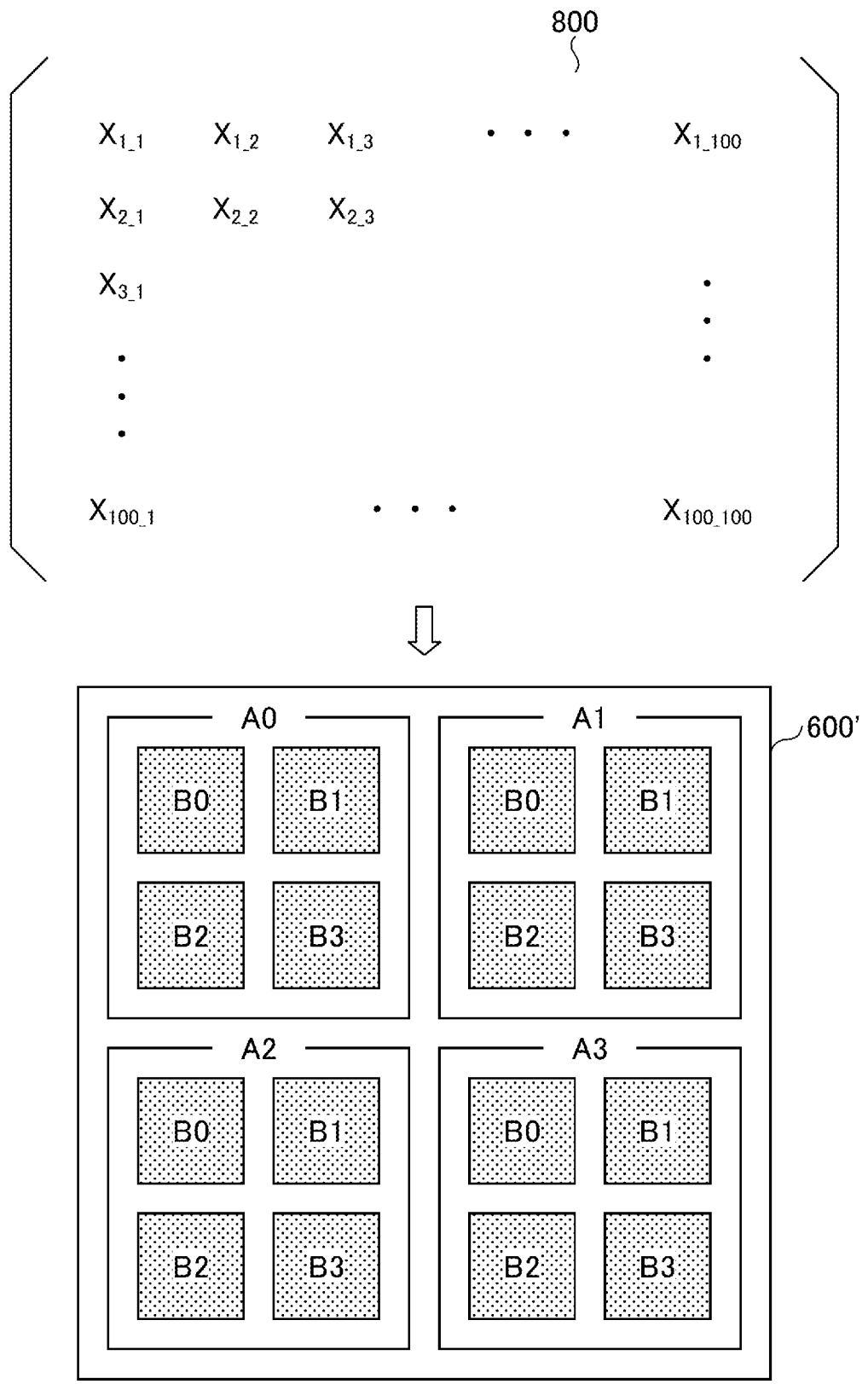
FIG. 8 is a first diagram illustrating an example of processing by a writing unit.

Next, a specific example of a process of writing values of each element of the tensor X into the corresponding memory according to the address allocated by the allocation unit 241 (i.e., FIG. 6A) will be described. FIG. 8 is a first diagram illustrating an example of processing by the writing unit.

In FIG. 8, reference numeral 800 illustrates an example of the values (the data stored in the data storage unit 214) of each element of the tensor X of 100 rows by 100 columns. In FIG. 8, a reference numeral 600' indicates that the values of each element of the tensor X are written in the memory included in the block of Level B of the chip 600.

For example, the addresses of the memory included in the block with block name="B0" within the block with block name="A0" are written as follows. The addresses "0" to "24" are written as $x_{1\_1}$ to $x_{1\_25}$. The addresses "25" to "49" are written as $x_{2\_1}$ to $x_{2\_25}$. The addresses "600" to "624" are written as $x_{25\_1}$ to $x_{25\_25}$.

Further, for example, the addresses of the memory included in the block with block name="B1" within the block with block name="A0" are written as follows. The addresses "0" to "24" are written as $x_{1\_26}$ to $x_{1\_50}$. The addresses "25" to "49" are written as $x_{2\_26}$ to $x_{2\_50}$. The addresses "600" to "624" are written as $x_{25\_26}$ to $x_{25\_50}$.

Further, for example, the addresses of the memory included in the block with block name="B2" within the block with block name="A0" are written as follows. The addresses "0" to "24" are written as $x_{26\_1}$ to $x_{26\_25}$. The addresses "25" to "49" are written as $x_{27\_1}$ to $x_{27\_25}$. The addresses "600" to "624" are written as $x_{50\_1}$ to $x_{50\_25}$.

Further, for example, the addresses of the memory included in the block with block name="B3" within the block with block name="A0" are written as follows. The addresses "0" to "24" are written as $x_{26\_26}$ to $x_{26\_50}$. The addresses "25" to "49" are written as $x_{27\_26}$ to $x_{27\_50}$. The addresses "600" to "624" are written as $x_{50\_26}$ to $x_{50\_50}$.

Similarly, the values of each element of the tensor X are written to the memory included in the block of Level B.

As described above, in the writing unit 251, each element of 100 rows by 100 columns can be written to the memory included in the block of Level B of the chip 600.

(2) Example 2

Figure 9:
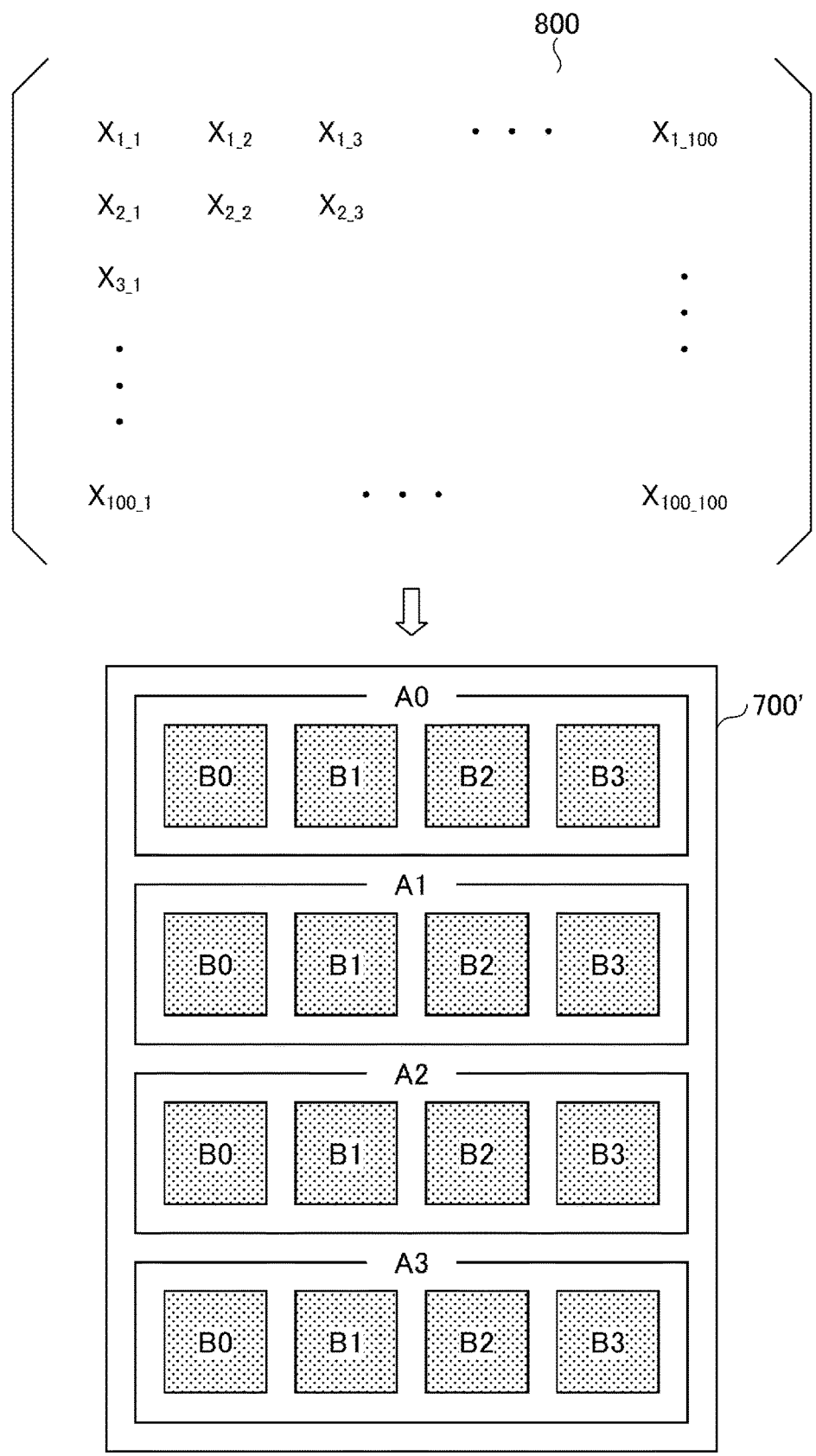
FIG. 9 is a second diagram illustrating an example of processing by the writing unit.

Next, a specific example of a process of writing values of each element of the tensor X into the corresponding memory according to the address allocated by the allocation unit 241 (i.e., FIG. 7A) will be described. FIG. 9 is a second diagram illustrating an example of processing by the writing unit.

In FIG. 9, reference numeral 800 illustrates an example of the values (the data stored in the data storage unit 214) of each element of the tensor X of 100 rows by 100 columns. In FIG. 9, a reference numeral 700' indicates that the values of each element of the tensor X are written in the memory included in the block of Level B of the chip 700.

For example, the addresses of the memory included in the block with block name="B0" within the block with block name="A0" are written as follows. The addresses "0" to "24" are written as $x_{1\_1}$ to $x_{2\_25}$. The addresses "25" to "49" are written as $x_{2\_1}$ to $x_{2\_25}$. The addresses "600" to "624" are written as $x_{25\_1}$ to $x_{25\_25}$.

Further, for example, the addresses of the memory included in the block with block name="B1" within the block with block name="A0" are written as follows. The addresses "0" to "24" are written as $x_{1\_26}$ to $x_{1\_50}$. The addresses "25" to "49" are written as $x_{2\_26}$ to $x_{2\_50}$. The addresses "600" to "624" are written as $x_{25\_26}$ to $x_{25\_50}$.

Further, for example, the addresses of the memory included in the block with block name="B2" within the block with block name="A0" are written as follows. The addresses "0" to "24" are written as $x_{1\_51}$ to $x_{1\_75}$. The addresses "25" to "49" are written as $x_{2\_51}$ to $x_{2\_75}$. The addresses "600" to "624" are written as $x_{25\_51}$ to $x_{25\_75}$.

Further, for example, the addresses of the memory included in the block with block name="B3" within the block with block name="A0" are written as follows. The addresses "0" to "24" are written as $x_{1\_76}$ to $x_{1\_100}$. The addresses "25" to "49" are written as $x_{2\_76}$ to $x_{2\_100}$. The addresses "600" to "624" are written as $x_{25\_76}$ to $x_{25\_100}$.

Similarly, the values of each element of the tensor X are written to the memory included in the block of Level B.

As described above, in the writing unit 251, each element of 100 rows by 100 columns can be written to the memory included in the block of level B of the chip 700.

Example of Processing by Element Value Reading Unit

Next, a specific example of processing performed by the element value reading unit 252 will be described. As described above, the element value reading unit 252 reads out the value of the specified element of the tensor written into the memory based on the index description included in the source code 230.

(1) Example 1

FIG. 10 is a first diagram illustrating an example of processing by the element value reading unit. The example in FIG. 10 illustrates how the value of each element of the tensor X, represented by reference numeral 800 in FIG. 8, reads the value of the index (91, 36) in the state written in the chip 600 (refer to the reference numeral 600') under the "layout description" in FIG. 6B.

As illustrated in FIG. 10, the element value reading unit 252 specifies a vertical block of Level A based on a quotient value obtained by dividing a value (="91") for specifying a vertical address by the number of vertical elements (="50") per block of Level A.

In the example of FIG. 10, since the quotient value is "1", the element value reading unit 252 specifies that the vertical block of Level A is the first block (block name="A2" or "A3").

Subsequently, the element value reading unit 252 specifies the vertical block of Level B based on the quotient value obtained by dividing the remainder value (="41") by the number of vertical elements (="25") per block of Level B.

In the example of FIG. 10, since the quotient value is "1", the element value reading unit 252 specifies that the vertical block of Level B is the first block (block name="B2" or "B3").

Subsequently, the element value reading unit 252 specifies that the vertical position of the tensor is the 16th row by referring to the remainder value (="16").

Similarly, the element value reading unit 252 specifies a horizontal block of Level A based on a quotient value obtained by dividing a value (="36") for specifying a horizontal address by the number of horizontal elements (="50") per block of Level A.

In the example of FIG. 10, since the quotient value is "0", the element value reading unit 252 specifies that the horizontal block of Level A is the zeroth block (block name="A0" or "A2").

Subsequently, the element value reading unit 252 specifies the horizontal block of Level B based on the quotient value obtained by dividing the remainder value (="36") by the number of horizontal elements (="25") per block of Level B.

In the example of FIG. 10, since the quotient value is "1", the element value reading unit 252 specifies that the horizontal block of Level B is the first block (block name="B1" or "B3").

Subsequently, the element value reading unit 252 specifies that the horizontal position of the tensor is the 11th column based on the remainder value (="11").

Therefore, the element value reading unit 252 specifies that "the block of Level A is block name=A2", "the block of Level B is block name=B2", and "the memory address is 16th row×25+11th column=411th address (refer to reference numeral 1000)."

As a result, the element value reading unit 252 reads out the value written to the address specified based on the index description.

Thus, the index (91, 36) is decomposed into ((1, 1, 16), (0, 1, 11)). By calculating "1×stride (="2")+0×stride (="1")=2" as a block of Level A, the block name="A2" can be specified. By calculating "1×stride (="2")+1×stride (="1")=3" as a block of Level B, the block name="B2" can be specified. By calculating "16×stride (="25")+11×stride (="1")=411" as a memory address, the block name="411th address" can be specified.

For example, in the present embodiment, the ((1, 1, 16), (0, 1, 11)) obtained by decomposing the index (91, 36) by the element value reading unit 252 as described above is referred to as a decomposed index. For example, in the present embodiment, the block name="A2", the block name="B3", and the memory address="411th address" specified by the element value reading unit 252 from the index (91, 36) as described above are referred to as an "index per hierarchy."

Expressions such as ((1,1,16), (0,1,11)) which is a "decomposed index" or ("A2", "B3", "411th address") which is an "index per hierarchy" may be used in the process of generating a machine code by the compiler unit 213. For example, these expressions may be used as a method of specifying each element of the tensor when generating a machine code that performs a change in layout with respect to the same tensor.

When the value of each element of the tensor X represented by reference numeral 800 in FIG. 8 is written into the chip 600, the communication cost can be reduced in a situation where the tensor X is calculated in units such as a 3×3 matrix or a 5×5 matrix. This is because the number of times straddling different blocks in Level A can be reduced when performing an arithmetic operation in units such as 3×3 matrix or 5×5 matrix. Note that arithmetic operations performed in units such as a 3×3 matrix or a 5×5 matrix include, for example, convolution processing and pooling processing.

(2) Example 2

FIG. 11 is a second diagram illustrating an example of processing by the element value reading unit. The example in FIG. 11 illustrates how the value of each element of the tensor X, represented by reference numeral 900 in FIG. 9, reads the value of the index (91, 36) in the state written in the chip 700 (refer to the reference numeral 700') under the "layout description" in FIG. 7B.

As illustrated in FIG. 11, the element value reading unit 252 specifies a vertical block of Level A based on a quotient value obtained by dividing a value (="91") for specifying a vertical address by the number of vertical elements (="25") per block of Level A.

In the example of FIG. 11, since the quotient value is "3", the element value reading unit 252 specifies that the vertical block of Level A is the third block (block name="A3").

Subsequently, the element value reading unit 252 specifies that the vertical position of the tensor is the 16th row by referring to the remainder value (="16").

Similarly, the element value reading unit 252 specifies a horizontal block of Level B based on a quotient value obtained by dividing a value (="36") for specifying a horizontal address by the number of horizontal elements (="25") per block of Level B.

In the example of FIG. 11, since the quotient value is "1", the element value reading unit 252 specifies that the horizontal block of Level B is the first block (block name="B1").

Subsequently, the element value reading unit 252 specifies that the horizontal position of the tensor is the 11th column based on the remainder value (="11").

Therefore, the element value reading unit 252 specifies that "the block of Level A is block name=A3", "the block of Level B is block name=B1", and "the memory address is 16th row×25+11th column=411th address (refer to reference numeral 1100)."

As a result, the element value reading unit 252 reads out the value written to the address specified based on the index description.

Thus, the index (91, 36) is decomposed into ((3, 16), (1, 11)). By calculating "3×stride (="1")=3" as a block of Level A, the block name="A3" can be specified. By calculating "1×stride (="1")=1" as a block of Level B, the block name="B1" can be specified. By calculating "16×stride (="25")+11×stride (="1")=411" as a memory address, the block name="411th address" can be specified.

When the value of each element of the tensor X represented by reference numeral 900 in FIG. 9 is written into the chip 700, the communication cost can be reduced in a situation where, for example, the statistical value of the tensor X for each row is calculated. This is because there is no need to straddle different blocks in Level A when calculating row-by-row statistics of the tensor X.

<Flow of Data Processing by Data Processing System>

Next, a flow of data processing by the data processing system 100 will be described. Here, the source code generation process by the source code description unit 211 and the generation unit 212, the machine code generation process by compiler unit 213, and the machine code execution process by the execution unit 220 will be described separately.

(1) Source Code Generation Process

Figure 12:
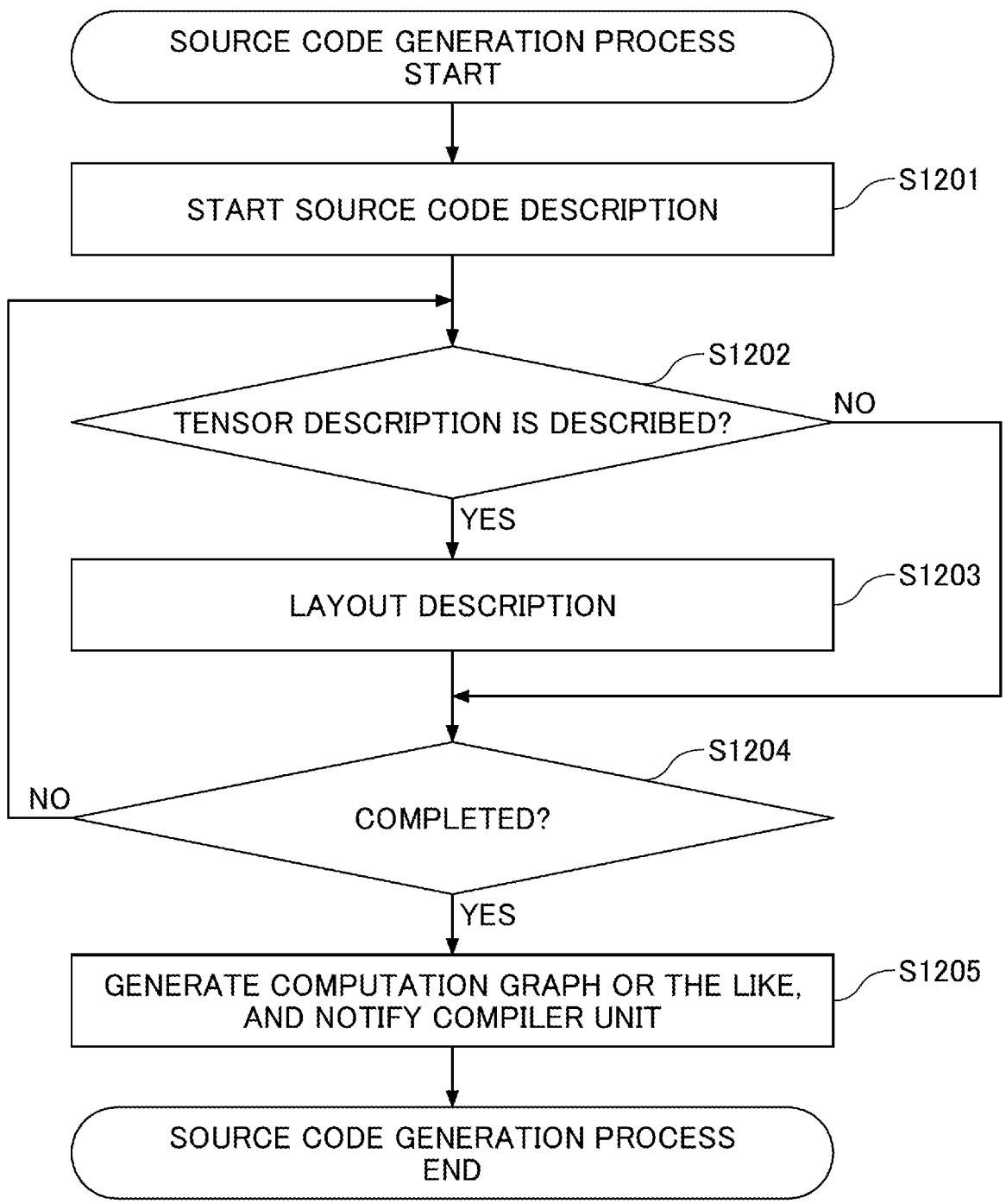
FIG. 12 is a flowchart illustrating a flow of a source code generation process.

First, the flow of the source code generation process performed by the source code description unit 211 and the generation unit 212 will be described. FIG. 12 is a flowchart illustrating a flow of the source code generation process. When the user starts the source code description unit 211, the source code generation process illustrated in FIG. 12 is started.

In step S1201, the user starts describing the source code. Therefore, the source code description unit 211 receives the description of the source code from the user.

In step S1202, the user determines whether the tensor description is described, and if it is determined that the tensor description is described (in the case of YES in step S1202), the process proceeds to step S1203. Accordingly, the source code description unit 211 receives the tensor description from the user.

In step S1203, the user describes the layout description and proceeds to step S1204. Accordingly, the source code description unit 211 receives the layout description from the user.

Conversely, when it is determined in step S1202 that the tensor description is not described (in the case of NO in step S1202), the process proceeds directly to step S1204.

In step S1204, the user determines whether to terminate the description of the source code. When it is determined in step S1204 that the description of the source code is not completed (in the case of NO in step S1204), the process returns to step S1202 and the description of the source code continues.

Conversely, when it is determined in step S1204 that the description of the source code is completed (in the case of YES in step S1204), the process proceeds to step S1205.

In step S1205, the user instructs the generation unit 212 to start generating a computation graph or the like. Accordingly, the generation unit 212 obtains the source code from the source code description unit 211 and generates the computation graph or the like. The generation unit 212 notifies the compiler unit 213 of the generated computation graph or the like.

(2) Machine Code Generation Process

Figure 13:
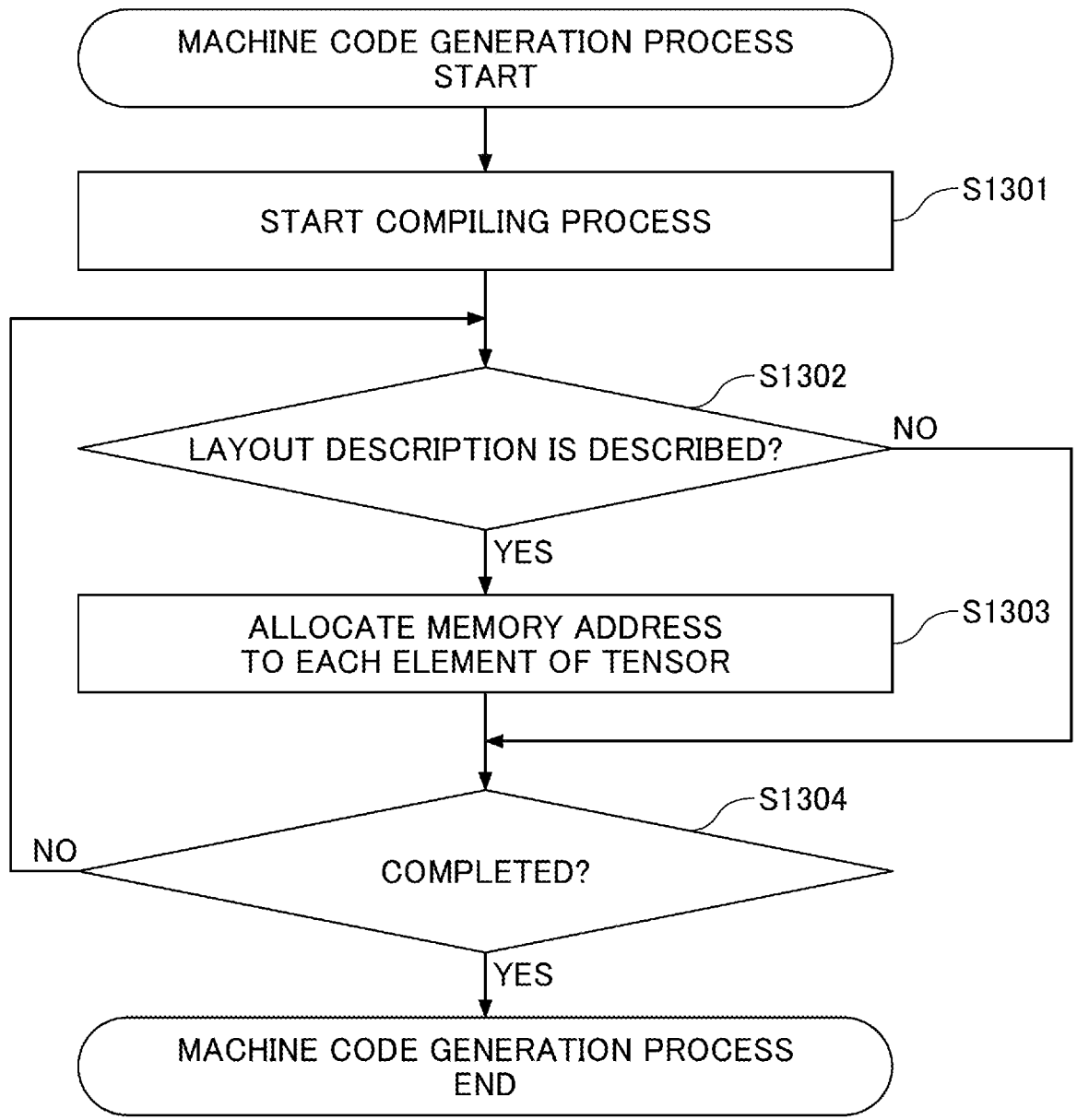
FIG. 13 is a flowchart illustrating a flow of a machine code generation process.

Next, the flow of the machine code generation process by the compiler unit 213 will be described. FIG. 13 is a flowchart illustrating a flow of the machine code generation process. When the user starts the compiler unit 213 of the compiler 120, the compiler unit 213 starts the machine code generation process illustrated in FIG. 13.

In step S1301, the compiler unit 213 starts the compiling process based on the computation graph or the like.

In step S1302, the compiler unit 213 determines whether the layout description is described. When it is determined in step S1302 that the layout description is described (in the case of YES in step S1302), the process proceeds to step S1303.

In step S1303, the compiler unit 213 allocates a memory address to each element of the tensor based on the layout description and proceeds to step S1304.

On the other hand, in step S1302, when it is determined that the layout description is not described (in the case of NO in Step S1302), the process proceeds directly to step S1304.

In step S1304, it is determined whether the compiling process is completed with respect to the computation graph or the like. When it is determined in step S1304 that the compiling process is not completed (in the case of NO in step S1304), the process returns to step S1302 and the compiling process continues.

On the other hand, when it is determined in step S1304 that the compiling process is completed (in the case of YES in step S1304), the machine code generation process is terminated.

(3) Machine Code Execution Process

Figure 14:
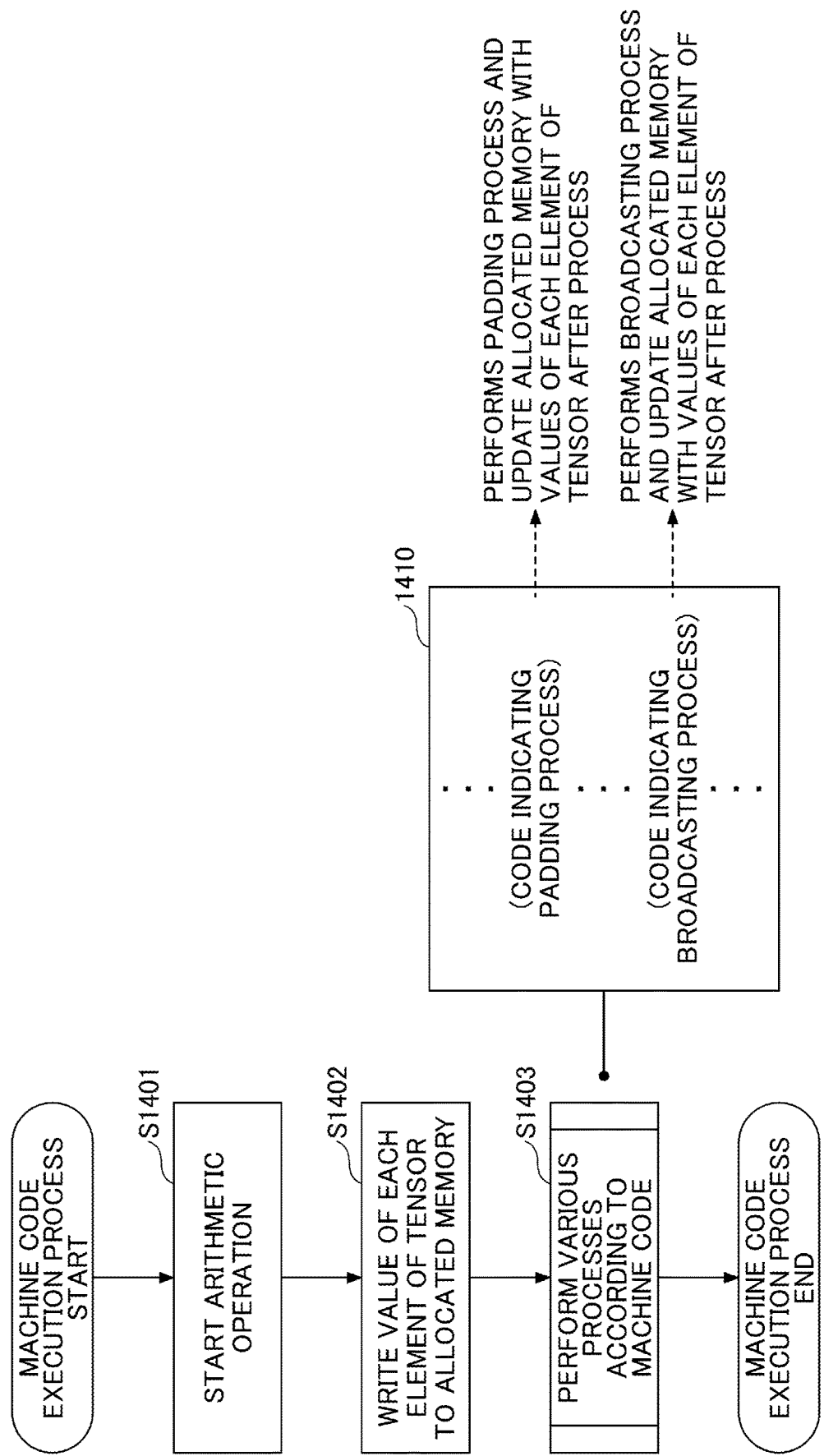
FIG. 14 is a flowchart illustrating a flow of a machine code execution process.

Next, a flow of the machine code execution process by the execution unit 220 will be described. FIG. 14 is a flowchart illustrating a flow of the machine code execution process. When the user specifies the data to be processed stored in the data storage unit 214 and inputs an execution instruction to the execution unit 220 of the server device 110, the execution unit 220 starts the machine code execution process illustrated in FIG. 14.

In step S1401, the execution unit 220 starts an arithmetic operation of the machine code.

In step S1402, the execution unit 220 writes the value of each element of the tensor (the data to be processed stored in the data storage unit 214) to the allocated memory address.

In step S1403, the execution unit 220 sequentially performs various processes included in a machine code 1410. For example, the execution unit 220 performs a padding process according to a code indicating the padding process and updates the allocated memory with the values of each element of the tensor after the process. Further, the execution unit 220 performs a broadcasting process according to a code indicating the broadcasting process and updates the allocated memory with the value of each element of the tensor after the process.

When all of the various processes included in the machine code 1410 are executed, or when a predetermined termination condition is satisfied, the execution unit 220 terminates the machine code execution process.

SUMMARY

As is clear from the above description, the compiler 120 according to the first embodiment generates a machine code to be executed in an accelerator chip including multiple distributed memories connected by a tree structure topology. Further, the compiler 120 according to the first embodiment allocates addresses in multiple memories of the accelerator chip to each element of the tensor to be processed based on a stride (vertical or horizontal) and the number of divisions for each hierarchy with respect to the tensor to be processed.

This enables, according to the first embodiment, the arrangement of each element of the tensor into multiple memories connected by the tree structure topology to be properly represented.

Second Embodiment

In the first embodiment, the compiler 120 is described as being disposed within the server device 110. However, the compiler 120 may be configured separately from the server device 110. In the first embodiment, the compiler unit 213 is implemented by the compiler 120. However, the compiler unit 213 may be implemented, for example, by a terminal device (not illustrated). Alternatively, the compiler unit 213 may be implemented in other external devices (for example, other server devices) other than the terminal.

In the first embodiment, the source code description unit 211, the generation unit 212, and the compiler unit 213 are implemented by the compiler 120. However, the source code description unit 211 may be implemented in a terminal device connected to the server device 110 including the compiler 120 through a network. Alternatively, the source code description unit 211 and the generation unit 212 may be implemented in a terminal device connected to the server device 110 including the compiler 120 through the communication network 150.

Figure 15:
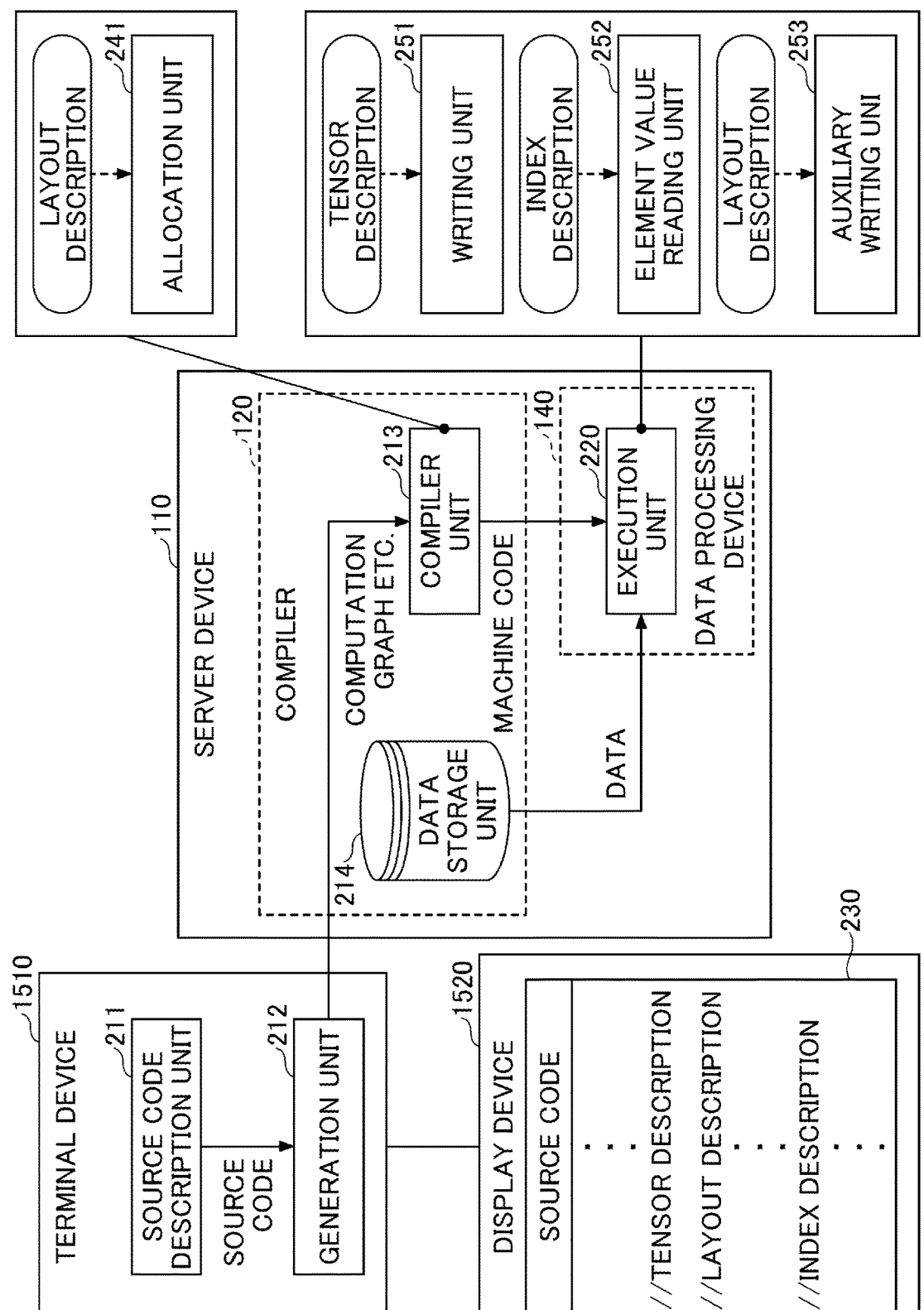
FIG. 15 is a second diagram illustrating an example of a functional configuration of each device of a data processing system.

FIG. 15 is a second diagram illustrating an example of a functional configuration of each device of a data processing system. In the example of FIG. 15, a source code description unit 211 and a generation unit 212 are implemented by a terminal device 1510, and a source code 230 is displayed on a display device 1520 connected to the terminal device 1510. In the example of FIG. 15, a computation graph or the like generated by the terminal device 1510 is transmitted to the compiler 120.

In the first embodiment, the computation graph is described as being generated by executing the source code 230 and converting it into the ONNX expression form. However, the method of generating the computation graph is not limited thereto, and other methods may be used to generate the computation graph.

In the first embodiment, the generation unit 212 generates the layout instruction based on the layout description input by the user, and the compiler unit 213 allocates the address to each element of the tensor according to the layout instruction. However, the method of allocating address is not limited thereto, for example, the compiler unit 213 may select a layout and allocate an address to each element of the tensor according to the selected layout.

In the above-described first embodiment, for example, the chip 170_1 includes four third hierarchical blocks in the hierarchy of Level A and includes four second hierarchical blocks in the hierarchy of Level B (i.e., FIG. 3). However, the number of blocks (memories) and tiers (depth) of each hierarchy are not limited to this and may be selected appropriately.

Further, in the first embodiment, Level A hierarchy is third hierarchical block, Level B hierarchy is second hierarchical block, and Level C hierarchy is the first hierarchical block. However, the definition of each hierarchy is not limited to this, for example, Level A hierarchy may be the chip, Level B hierarchy may be the third hierarchical block, Level C hierarchy may be the second hierarchical block, and Level D hierarchy may be the first hierarchical block. Alternatively, Level A hierarchy may be the chip and the third hierarchy block, Level B hierarchy may be the second hierarchical block, and Level C hierarchy may be the first hierarchical block.

Further, when the "Level A hierarchy is the chip and the third hierarchical block" is used, for example, it is assumed that four chips are mounted on a single board and each chip has four third hierarchical blocks. In this case, the layout of Level A hierarchy can be described as if there were 16 third hierarchical blocks.

The hierarchy to which the memory belongs is not limited to the lowest hierarchy, but may be changed to another hierarchy. The first and second embodiments may also be applied by defining hierarchies such as the structure that bundles top hierarchy level memory (for example, the chips), the structure that bundles the chips (for example, node), and the structure that bundles the nodes.

Other Embodiments

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-bb, and a-a-b-b-c-c. Further, the addition of another element other than the listed elements (i.e., a, b, and c), such as adding d as a-b-c-d, is included.

In the present specification (including the claims), if the expression such as "data as an input", "based on data", "according to data", or "in accordance with data" (including similar expressions) is used, unless otherwise noted, a case in which various data themselves are used as an input and a case in which data obtained by processing various data (e.g., data obtained by adding noise, normalized data, and intermediate representation of various data) are used as an input are included. If it is described that any result can be obtained "based on data", "according to data", or "in accordance with data", a case in which the result is obtained based on only the data are included, and a case in which the result is obtained affected by another data other than the data, factors, conditions, and/or states may be included. If it is described that "data are output", unless otherwise noted, a case in which various data themselves are used as an output is included, and a case in which data obtained by processing various data in some way (e.g., data obtained by adding noise, normalized data, and intermediate representation of various data) are used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if terms such as "optimize/optimize" are used, such terms should be interpreted as appropriate, according to a context in which the terms are used, including determining a global optimization, finding an approximate global optimization, finding a local optimization, and finding an approximate local optimization. The meaning also includes determining an approximate value of such an optimal value stochastically or heuristically.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in all of the embodiments described above, numerical values or mathematical expressions used for description are presented as an example and are not limited to them. Additionally, the order of respective operations in the embodiment is presented as an example and is not limited thereto.

What is claimed is:

1. A compiler for generating a machine code to be executed in a chip including a plurality of distributed memories connected by a tree structure, the compiler comprising:
at least one memory; and
at least one processor,
wherein the at least one processor is configured to:
acquire a tensor to be processed in the chip;
perform an associating process in which each element of the tensor is associated with an address in the plurality of distributed memories included in the chip, based on a stride and a number of divisions in a hierarchy of the tree structure with respect to the tensor,
generate the machine code to be executed in the chip based on the associating process,
wherein the tree structure corresponds to a hardware configuration of the chip, and includes at least a first hierarchy and a second hierarchy, the second hierarchy being higher than the first hierarchy, wherein the first hierarchy includes a plurality of first blocks, and wherein the associating process further includes dividing the tensor according to at least a number of divisions in the first hierarchy and specifying to which of the plurality of first blocks in the first hierarchy each element after the division of the tensor belongs according to a stride in the first hierarchy.

2. The compiler according to claim 1, wherein the associating further includes associating each element belonging to a block specified in a lowest hierarchy with an address in a corresponding memory, according to a stride of the lowest hierarchy.

3. The compiler according to claim 1, wherein the number of divisions in the hierarchy includes a number of vertical divisions and a number of horizontal divisions, and the stride in the hierarchy includes a stride in a vertical direction and a stride in a horizontal direction.

4. The compiler according to claim 1, wherein the stride and the number of divisions in the hierarchy of the tree structure with respect to the tensor are described in a source code.

5. The compiler according to claim 1, wherein the number of divisions in the first hierarchy and a number of divisions in the second hierarchy are different from each other, and
the stride in the first hierarchy and a stride in the second hierarchy are different from each other.

6. The compiler according to claim 1, wherein the at least one processor is further configured to acquire a computation graph to be processed in the chip,
wherein the tensor is a tensor used in the computation graph.

7. The compiler according to claim 6, wherein the at least one processor is further configured to generate the computation graph based on a source code.

8. The compiler according to claim 1, wherein the second hierarchy includes a plurality of second blocks, each of which includes the plurality of first blocks, and
wherein the associating process includes:
dividing the tensor according to at least a number of divisions in the second hierarchy; and
specifying, according to a stride in the second hierarchy, to which block of the plurality of second blocks each element of the tensor after the division of the tensor belongs.

9. The compiler according to claim 1,
wherein each of the plurality of first blocks includes a memory among the plurality of distributed memories.

10. The compiler according to claim 1,
wherein each of the plurality of first blocks includes at least one arithmetic unit.

11. A chip including a plurality of distributed memories connected by a tree structure including at least a first hierarchy and a second hierarchy that is higher than the first hierarchy, the chip having a plurality of first blocks in the first hierarchy, said chip being configured to:
execute a machine code that is generated by performing an associating process in which each element of a tensor to be processed is associated with an address in the plurality of distributed memories included in the chip, based on a stride and a number of divisions in a hierarchy of the tree structure with respect to the tensor; and
perform at least one of a process of writing a value of each element of the tensor to be processed into an address associated with each element or a process of reading out a value of each element of the tensor to be processed from an address associated with each element,
wherein the associating process further includes dividing the tensor according to at least a number of divisions in the first hierarchy and specifying to which of the plurality of first blocks in the first hierarchy each element after the division of the tensor belongs according to a stride in the first hierarchy.

12. The chip according to claim 11, wherein, when writing the value of each element of the tensor to be processed into the address associated with each element, a padding process is performed to adjust a size according to a memory to be written to.

13. The chip according to claim 11, wherein a broadcasting process is performed when an arithmetic operation between tensors whose array shapes do not match is performed.

14. The chip according to claim 11, wherein each of the plurality of first blocks includes at least one
arithmetic unit.

15. The chip according to claim 11, wherein the chip operates by a Single Instruction/Multiple Data (SIMD) architecture.

16. The chip according to claim 11, wherein the plurality of distributed memories are composed of Static Random Access Memories (SRAM).

17. The chip according to claim 11,
wherein the second hierarchy includes a plurality of second blocks, each comprising the plurality of first blocks, and
wherein the associating process includes:
dividing the tensor according to at least a number of divisions in the second hierarchy, and
specifying to which of the plurality of second blocks each element after division of the tensor belongs according to a stride in the second hierarchy.

18. The chip according to claim 11,
wherein each of the plurality of first blocks includes any one of the plurality of memories.

19. A method for generating a machine code performed by at least one processor included in a compiler apparatus, said method comprising:
acquiring a tensor to be processed in a chip including a plurality of distributed memories connected by a tree structure;
performing an associating process in which each element of the tensor is associated with an address in the plurality of distributed memories included in the chip, based on a stride and a number of divisions in a hierarchy of the tree structure with respect to the tensor,
generating the machine code to be executed in the chip based on the associating process,
wherein the tree structure corresponds to a hardware configuration of the chip, and includes at least a first hierarchy and a second hierarchy, the second hierarchy being higher than the first hierarchy,
wherein the first hierarchy includes a plurality of first blocks, and
wherein the associating process further includes dividing the tensor according to at least a number of divisions in the first hierarchy and specifying to which of the plurality of first blocks in the first hierarchy each element after the division of the tensor belongs according to a stride in the first hierarchy.

20. A non-transitory computer-readable storage medium having stored therein a program for causing the at least one processor to execute the method according to claim 19.

\* \* \* \* \*